R. D. Chatterton. Sheet 1, 2 Sheets.
Paddle Wheel.
N° 3,679.    Patented Jul. 24, 1844.
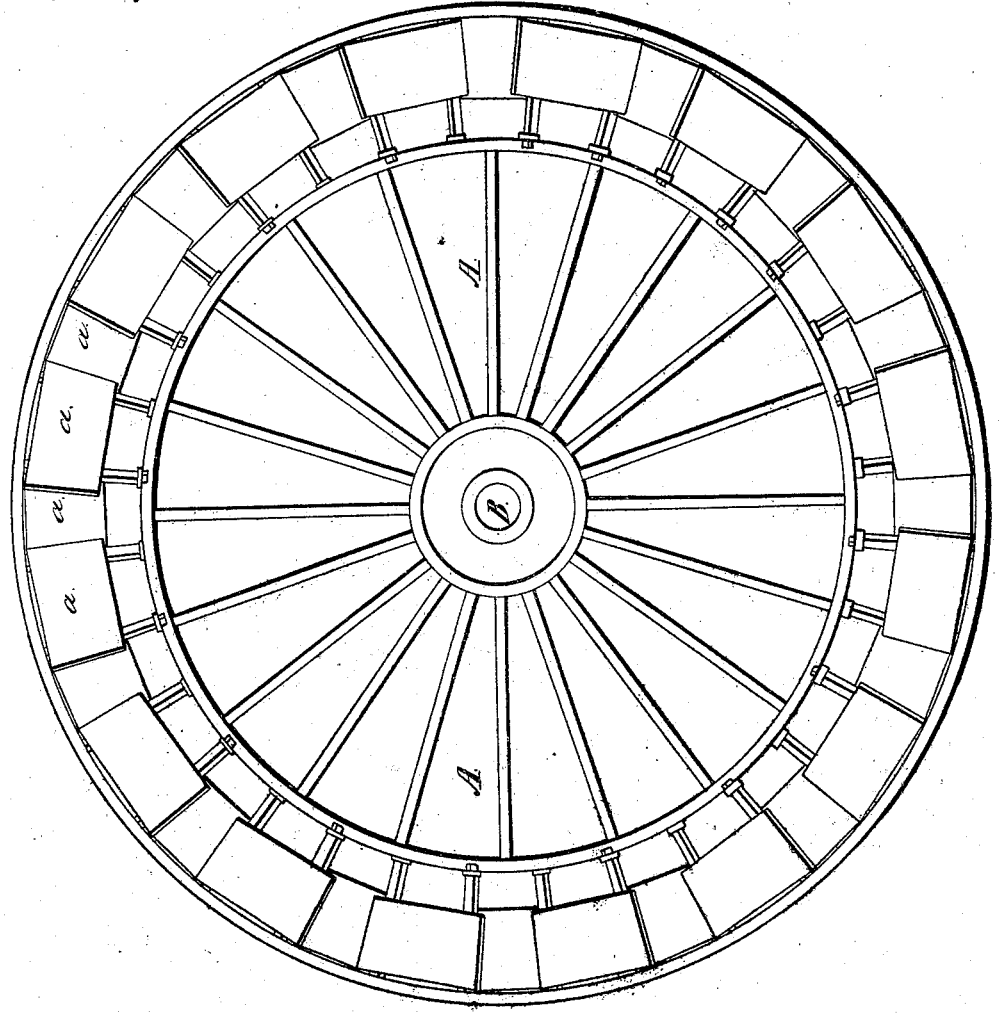
Witnesses
J. C. Robertson
R. H. Vrooman
Inventor
Rich.D Chatterton R. D. Chatterton. Sheet 2, 2 Sheets.
Paddle Wheel.
Nº 3,679. Patented Jul. 24, 1844.
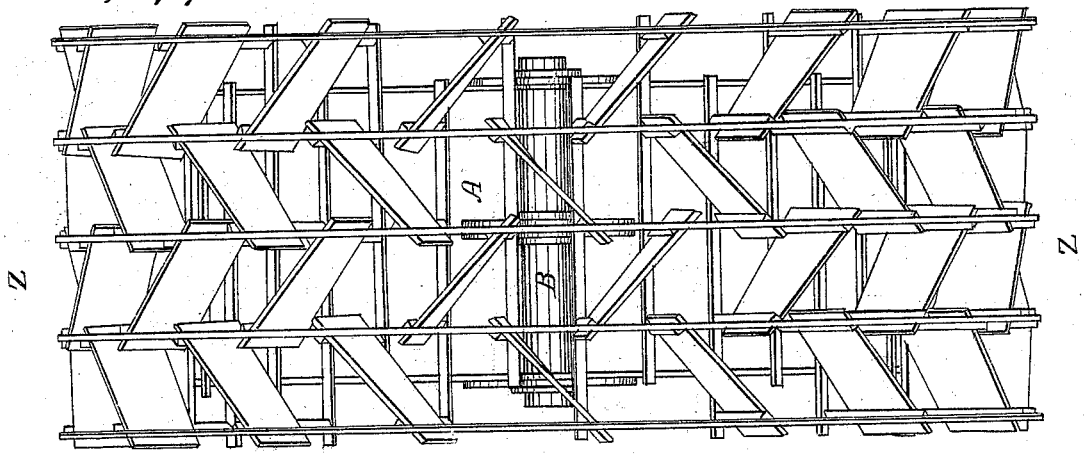
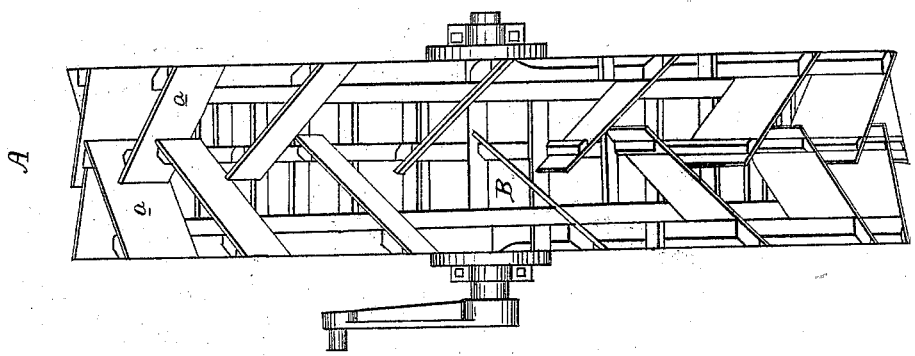
Witnesses.
J. B. Robertson
R. H. Vrooman
Inventor
Rich'd D. Chatterton

UNITED STATES PATENT OFFICE.

RICHARD D. CHATTERTON, OF DERBY, ENGLAND.

IMPROVEMENT IN PADDLE-WHEELS OF STEAMBOATS AND OTHER VESSELS.

Specification forming part of Letters Patent No. 3,679, dated July 24, 1844.

*To all whom it may concern:*

Be it known that I, the undersigned, RICHARD DOVER CHATTERTON, of Derby, in that part of the United Kingdom of Great Britain called England, have invented certain Improvements in Propelling; and I, the said RICHARD DOVER CHATTERTON, do hereby declare that the said invention consists in an arrangement or adjustment of the paddle floats or boards of steamboats and of all other vessels, machines, or bodies similarly propelled or moved by the action of floats or other like contrivances in and against water, whether such floats be made of wood, iron, or any other material used for the purpose; and I declare that the manner in which said improvements are to be performed is represented and exemplified in the drawing hereunto annexed, and in the following description thereof—that is to say:

A A is a paddle-wheel of a steam-vessel, constructed in the ordinary manner, except only as regards the floats $a\ a\ a\ a$. Instead of these floats being placed parallel to the shaft or axis B, as such floats are usually placed, they are fixed obliquely at a considerable angle thereto, and in alternate opposition to one another, as shown in the said drawing, the inner extremity of each float projecting beyond that of the one opposite to it. By placing the floats in these relative positions the amount of direct resistance from the water and of propulsive power thereby obtained is greater than is obtainable within the same width of space by any other arrangement of floats with which I am acquainted, while at the same time the power is exerted unintermittingly and continuously throughout each entire revolution of the wheel and acts in an equable and steady manner on the vessel and its machinery. In consequence, too, of the oblique direction in which the floats enter into and emerge from the water, as well as of the water being drawn (as it were) into the interior of the wheel between the floats, there is less of that backlift and dashing of the water against the sides of the vessel, which are so complained of and so peculiarly objectionable in canal and river navigation. Instead of one set of floats placed in alternate opposition to one another in the manner shown in the drawing, two or more sets placed side by side in manner shown by the drawing marked Z may be in many cases employed with advantage.

The same arrangement of floats which I have herein described as applicable to the paddle-wheels of steam-vessels may be adopted with the like advantage, in respect of power, in the case of undershot water-wheels, and with more or less advantage in all cases where a rotary or progressive motion is sought to be obtained by the action of such floats or other analogous means in and against water.

Having now described the nature of my said invention and the manner in which the same is to be performed, I declare that what I claim as of my invention in paddle-wheels of steamboats and of all other vessels, machines, or bodies which are propelled or moved by the action of floats or other like contrivances in and against water, in oblique positions relatively to the shafts or axes, and in series of pairs in oblique directions the reverse of one another, is—

The placing of the inner extremity of each of the individual paddles or floats so as to project beyond the inner termination of the one opposite thereto, and said inner extremities being at such distance from each other as to admit of the passage of water between them, as represented in the drawing hereunto annexed.

I do not claim the use of pairs of floats or paddles inclined toward each other, when such pairs meet and form an angular point, this having been often done; but I limit my claim to the particular arrangement of such pairs of floats or paddles, as herein set forth and represented, but without confining myself to the precise angles or relative distances at which the floats are there represented to be fixed and reserving to myself a right to place them at any more suitable angles or distances by which the like beneficial results may be obtained.

In testimony whereof I, the said RICHARD DOVER CHATTERTON, hereto subscribe my name, in the presence of the witnesses whose names are hereto subscribed, on the 1st day of June, in the year of our Lord 1844, at Cobourg, in the district of New Castle, in the Province of Canada.

RICHD. D. CHATTERTON.

Witnesses:
  ROBT. HY. THROOP,
    *Public Notary.*
  EBENEZER PERRY,
    *J. P., New Castle District.*